United States Patent
Straßer

(10) Patent No.: US 10,525,837 B2
(45) Date of Patent: Jan. 7, 2020

(54) METHOD FOR CONTROLLING AN ELECTRIC MACHINE FOR DRIVING A MOTOR VEHICLE, AND MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/779,672

(22) PCT Filed: Nov. 24, 2016

(86) PCT No.: PCT/EP2016/078677
§ 371 (c)(1),
(2) Date: May 29, 2018

(87) PCT Pub. No.: WO2017/093113
PCT Pub. Date: Jun. 8, 2017

(65) Prior Publication Data
US 2018/0370385 A1     Dec. 27, 2018

(30) Foreign Application Priority Data
Dec. 4, 2015   (DE) .................. 10 2015 015 697

(51) Int. Cl.
*B60L 15/20* (2006.01)
*G08G 1/0967* (2006.01)
(Continued)

(52) U.S. Cl.
CPC .......... *B60L 15/2045* (2013.01); *B60L 3/0061* (2013.01); *B60L 15/2072* (2013.01);
(Continued)

(58) Field of Classification Search
CPC .... B60L 50/51; B60L 3/0061; B60L 2220/12; B60L 2220/14; B60L 2240/30;
(Continued)

(56) References Cited

U.S. PATENT DOCUMENTS 5,077,508 A    12/1991   Wycoff et al.
6,629,515 B1   10/2003   Yamamoto et al.
(Continued)

FOREIGN PATENT DOCUMENTS

DE        19931161 A1    1/2001
DE     102004011938 A1    9/2005
(Continued)

OTHER PUBLICATIONS

Translation of International Preliminary Report on Patentability dated Jun. 21, 2018 in corresponding International Application No. PCT/EP2016/078677; 8 pages.
(Continued)

*Primary Examiner* — Atul Trivedi
(74) *Attorney, Agent, or Firm* — Maier & Maier, PLLC

(57) ABSTRACT

A method for controlling an electric machine for driving a motor vehicle. A flux density of at least one magnetic field generated in the electric machine is increased when an announcement signal is present that announces an upcoming acceleration command by the driver, and when a confirmation signal is present that confirms the announced acceleration command, the electric machine is controlled in such a way that the speed and/or torque thereof increases.

9 Claims, 2 Drawing Sheets

(51) Int. Cl.
  *G08G 1/0962* (2006.01)
  *B60L 50/51* (2019.01)
  *B60L 3/00* (2019.01)

(52) U.S. Cl.
  CPC .......... *B60L 50/51* (2019.02); *G08G 1/09623* (2013.01); *G08G 1/09626* (2013.01); *G08G 1/096725* (2013.01); *G08G 1/096758* (2013.01); *G08G 1/096783* (2013.01); *B60L 2220/12* (2013.01); *B60L 2220/14* (2013.01); *B60L 2240/30* (2013.01); *B60L 2240/421* (2013.01); *B60L 2240/423* (2013.01); *B60L 2240/70* (2013.01); *B60L 2250/26* (2013.01); *B60L 2260/22* (2013.01); *B60L 2260/24* (2013.01); *B60L 2260/26* (2013.01); *B60L 2260/50* (2013.01); *Y02T 10/645* (2013.01); *Y02T 10/7005* (2013.01); *Y02T 10/7283* (2013.01)

(58) Field of Classification Search
  CPC ......... B60L 2240/421; B60L 2240/423; B60L 2240/70; B60L 2250/26; B60L 2260/22; B60L 2260/24; B60L 2260/26; B60L 2260/50; G08G 1/09623; G08G 1/09626; G08G 1/096725; G08G 1/096758; G08G 1/096783; Y02T 10/645; Y02T 10/7005; Y02T 10/7283
  USPC .......................................................... 701/22
  See application file for complete search history.

(56) References Cited

U.S. PATENT DOCUMENTS

| | | | | |
|---|---|---|---|---|
| 2008/0272717 | A1* | 11/2008 | Gleason | B60K 6/365 318/139 |
| 2010/0116575 | A1 | 5/2010 | Nozawa et al. | |
| 2012/0138395 | A1* | 6/2012 | Curtis | B60L 58/21 188/159 |
| 2013/0201316 | A1* | 8/2013 | Binder | H04L 67/12 348/77 |
| 2013/0288853 | A1* | 10/2013 | Miyazaki | B60K 6/48 477/5 |
| 2014/0032029 | A1* | 1/2014 | Hirasawa | B60K 6/445 701/22 |
| 2014/0336892 | A1* | 11/2014 | Braunberger | B60W 30/04 701/70 |
| 2015/0096863 | A1* | 4/2015 | Maurel | H02P 6/08 192/84.1 |
| 2015/0122606 | A1* | 5/2015 | Vogel | B60L 50/16 192/20 |
| 2015/0224845 | A1* | 8/2015 | Anderson | B60G 17/019 701/37 |

FOREIGN PATENT DOCUMENTS

| | | |
|---|---|---|
| DE | 102011101487 A1 | 8/2012 |
| DE | 102012217899 A1 | 6/2014 |
| EP | 2110289 A2 | 10/2009 |
| EP | 2177390 B1 | 4/2010 |
| EP | 2609314 A1 | 7/2013 |
| GB | 2514790 A | 12/2014 |
| JP | 2003199205 A | 7/2003 |
| WO | 2016008792 A1 | 1/2016 |

OTHER PUBLICATIONS

Search Report dated Nov. 11, 2016 of corresponding German Application No. 10 2015 015 6971; 10 pgs.
International Search Report and Written Opinion dated Feb. 3, 2017 of corresponding Application No. PCT/EP2016/078677; 16 pgs.
International Preliminary Report on Patentability dated Mar. 15, 2018 of corresponding Application No. PCT/EP2016/078677; 20 pgs.
Search Report dated Aug. 4, 2017 of corresponding German Application No. 10 2015 015 697.7; 10 pgs.
Schröder, Dierk: "Elektrische Antriebe—Regelung von Antriebssystemen", 2001, 10 pgs.
Anonymous: "Firmware 7.0 Beta Discussion", Published: Sep. 18, 2015, URL:https://teslamotorsclub.com/tmc/threads/firmware-7-0-beta-discussion.52021/page-49, 12 pgs.
Anonymous: "RWD cars: when does v7 torque sleep kick in?", Submitted by Chunky Jr. on Nov. 15, 2015, URL:https://forums.tesla.com/forum/forums/rwd-cars-when-does-v7-torque-sleep-kick, 13 pgs.
Communication pursuant to Article 94(3) EPC dated Jul. 3, 2019, in corresponding European patent application No. 16801447.0 including partial machine-generated English language translation; 13 pages.

* cited by examiner

METHOD FOR CONTROLLING AN ELECTRIC MACHINE FOR DRIVING A MOTOR VEHICLE, AND MOTOR VEHICLE

FIELD

The invention relates to a method for controlling an electric machine for driving a motor vehicle.

BACKGROUND

In known hybrid or fully electrically driven vehicles, an acceleration command of a driver is typically implemented by evaluating a signal describing the actuation of an accelerator pedal of the motor vehicle by way of a control device assigned to an electric machine. Depending on said signal, the electric machine is then controlled to generate a determined rotational speed or a determined torque. For improvement of the energy consumption of the electric machine, it is additionally known, when the motor vehicle is at a standstill or when the motor vehicle is in non-actively driven coasting operation, to withdraw a magnetic field in the electric machine and to build it up again only when there is a renewed acceleration command. In this way, in an asynchronous machine with squirrel cage rotors, the rotating field generated by stator windings of the electric machine is reduced or completely cancelled at the standstill or in coasting operation, for example. However, the renewed buildup of the rotating field during a desired acceleration of the motor vehicle demands a certain latency time, during which the increase in rotational speed cannot yet be implemented. This reduces the effective acceleration capability of the motor vehicle and lengthens, for example, the time span for an acceleration from 0 km/h to 100 km/h.

For improvement of the acceleration capability of electrically driven motor vehicles, it is known from US 2010/0 116 575 A1 to provide a step-up converter, which supplies an increased voltage to an inverter supplying the stator windings. Additionally provided is a control device that limits the increased voltage when a blocked state of the supplied electric machine is detected and both an accelerator pedal and a brake pedal are not being actuated. However, a reduction in the previously mentioned latency times cannot be implemented in this way.

SUMMARY OF THE DISCLOSURE

The invention is therefore based on the object of presenting a possibility for improving the acceleration behavior or the response time to an acceleration command of the driver of a motor vehicle driven by an electric machine.

Provided for achieving this object in accordance with the invention is a method for controlling an electric machine for driving a motor vehicle, wherein a flux density of at least one magnetic field generated in the electric machine is increased when an announcement signal that announces an upcoming acceleration command of the driver is present, and after this, when a confirmation signal that confirms the announced acceleration command is present, the electric machine is controlled in such a way that the rotational speed and/or torque thereof increases.

The invention is based on the concept of anticipating the imminent acceleration command and building up the magnetic field in the electric machine early on in preparation for the confirmation signal. Consequently, a pre-magnetization of the electric machine is carried out, which may also be regarded as a feed-forward control. For this purpose, a control device, in particular, a motor control device is preferably assigned to the electric machine and this device evaluates at least one input signal, and when an input signal defined as an announcement signal is present, controls the electric machine to increase at least one magnetic field generated in it. Depending on the type of electric machine, the increase or the buildup of the magnetic field can occur directly in the stator and also, through induction effects, in the rotor or directly in the rotor, and, also through induction effects, in the stator.

If, subsequently, at least one additional input signal that is defined as a confirmation signal is detected, then the electric machine is controlled to increase its rotational speed and/or its torque, wherein the at least one magnetic field is already partially or completely built up, and hence the increase in the rotational speed and/or the torque by the electric machine can occur substantially more rapidly. Appropriately, the confirmation signal accordingly describes an active operating input of the driver, which is directed at an immediate acceleration of the motor vehicle. In other words, the electric machine is switched from a first operating state, in which the at least one magnetic field is deactivated or is generated with only a reduced flux density, in the presence of the announcement signal, to a second operating state, in which the electric machine can be controlled directly to increase its rotational speed and/or its torque. In particular, the first operating state of the electric machine is present when the motor vehicle is at a standstill or is in a coasting operation. In the scope of the method according to the invention, basically all types of electric machines, in particular asynchronous machines, permanently excited synchronous machines, or separately excited synchronous machines, can be used.

By way of the control of the electric machine in accordance with the invention, it is thereby possible to shorten or prevent the latency time required for the increase in the flux density of the at least one magnetic field, said latency time arising in that, when there is an acceleration command of the driver, the at least one magnetic field would otherwise initially have to be built up in order to control the electric machine in such a way that subsequently its rotational speed and/or its torque would be increased. In comparison with conventional methods, which provided a temporary increase in the currents and/or voltages that generate the at least one magnetic field, it is possible to achieve an improved acceleration behavior, without providing additional power electronics or, when, at the same time, power electronics devices in the form of step-up converters are used, to realize a more rapid supply of the power generated by them. In addition, on account of the anticipation, an acceleration command of the driver is implemented faster in an actual increase in the rotational speed and/or torque, so that a more agile and sporty driving behavior of the motor vehicle is made possible.

In the method according to the invention, it is especially preferred when the electric machine has a stator with a plurality of stator windings for generating a stator field as the magnetic field, wherein the stator windings are supplied with current for increasing the flux density of the stator field. In this case, the electric machine is designed more preferably as an asynchronous machine, because, in this case, a magnetic rotor field always has to be generated first via the rotating field of the stator, as a result of which, in conventional methods, especially high latency times arise. By way of the control in accordance with the invention, latency times of this kind on the order of magnitude of 100 ms can be prevented or at least reduced. However, the electric machine may also be a synchronous machine, in particular with a permanent exciter field, because, here, too, latency times for the buildup of the stator field arise and correspondingly can be reduced.

In the method according to the invention, it is also possible for the electric machine to have a rotor with at least one exciter winding for generating an exciter field as a magnetic field, wherein, for increasing the flux density of the exciter field, the at least one exciter winding is supplied with current. Typically, in this case, the electric machine is a separately excited synchronous machine, wherein here too, it is especially preferred additionally to supply current to its stator windings in order to increase the flux density of the stator field, as described above.

When the method according to the invention is carried out, a confirmation signal is used appropriately, which is generated when a driving actuation device of the motor vehicle is actuated. Typically, the driving actuation device is an accelerator pedal of the motor vehicle, wherein, depending on the design of the motor vehicle, it is obviously also possible to use driving actuation devices in the form of rotary handles or other manual actuation devices. The driver then initiates the acceleration of the motor vehicle in the usual way, wherein, on the basis of the building up of the at least one magnetic field, which has occurred in preparation, a rapid implementation of the acceleration command is achieved.

In addition, a large number of possibilities are conceivable in regard to the selection of suitable announcement signals. In the method according to the invention, for example, an announcement signal that is generated when a brake actuation device is released is preferably used. In this case, the brake actuation device acts preferably on the operating brake system and can be designed as a brake pedal or as a brake lever. The announcement signal can also be generated when a parking brake of a motor vehicle is released. What is crucial here is that, when the brake actuation device is released, it can be assumed that the driver of the motor vehicle wants to accelerate in the near future and, in preparation for such an upcoming acceleration command, the magnetic field is increased.

Alternatively or additionally, it can also be provided for this purpose that an announcement signal is used that is generated when an operating element not corresponding to a driving actuation device is actuated. What is involved here may be, for example, a touch-controlled element or a possible setting of a human-machine interface of the motor vehicle, via which the driver can announce a rapid acceleration of the motor vehicle. Typically, the driver of the motor vehicle shifts into a sport mode or the like by means of such an operating element, said mode specifying, besides its action as an announcement signal, also chassis adjustments or the equivalent for a sporty driving operation. If the driver actuates such an operating element, it can consequently be assumed that he wants to accelerate in the near future.

It can also be provided in the method according to the invention that an announcement signal that is generated by evaluation of sensor data of a proximity sensor measuring the proximity of the driver to a driving actuation device is used. For this purpose, the driving actuation device, that is, in particular the accelerator pedal, has a proximity sensor, which detects a movement of the driver and, in particular, of a foot of the driver, toward the driving actuation device and evaluates this as an imminent acceleration command of the driver. The special advantage of an announcement signal generated in this way lies in the fact that the driver unnoticeably triggers the announcement signal when said driver makes a customary movement for acceleration of the motor vehicle, so that, a short time after evaluation of the sensor data of the proximity sensor, the confirmation signal is generated by contact with the driving actuation device.

In addition, the "launch control" function is known for classical motor vehicles with internal combustion engines and an automatic transmission, in which the internal combustion engine is brought to an increased rotational speed even at standstill through simultaneous actuation of the brake pedal and the accelerator pedal and subsequently is maximally accelerated via a starting clutch. For electrically operated motor vehicles, however, often no starting clutch that would make possible such a starting operation is provided. In order to provide a similar function to the driver of the motor vehicle operated by the electric machine, however, it is possible in the scope of the method according to the invention, when the motor vehicle is at a standstill, to use an announcement signal that is generated when a driving actuation device is actuated together with a braking actuation device, wherein, when said announcement signal is present, a confirmation signal that is generated when the braking actuation device is released is used. The driver can thus generate the announcement signal in a known way from standstill by simultaneous actuation of the brake pedal and accelerator pedal and thereby demand an increase in the flux density of the at least one magnetic field. If the driver then releases the braking actuation device, the electric machine can be controlled immediately to increase the rotational speed and/or the torque and to supply its torque, without said acceleration process being delayed by latency times due to an initially required buildup of the at least one magnetic field.

Moreover, it is advantageously possible in the method according to the invention to provide that an announcement signal that is generated through evaluation of information describing the surroundings of a motor vehicle in the direction of travel is used. Such information about the surroundings can be provided, for example, by a navigation device of the motor vehicle, the output signals of which can be evaluated as input signals of the control device of the electric machine. In an analogous way, however, information about the surroundings can also be generated by sensors of the motor vehicle, such as image sensors, ultrasound sensors, radar sensors, or laser sensors, or sensors detecting the driving state of the motor vehicle, for example, a driving dynamics regulation device of the motor vehicle. Appropriately, the control device receives said information about the surroundings via a link to a bus system of the motor vehicle, the data signals of which are received by said control device for detection of the data signals defined as announcement signals.

In this way, for example, it can be provided that the information about the surroundings describes a cancellation or an increase of a speed limit. Such data about the surroundings can be acquired, for example, from the navigation device or by means of a camera that records the surroundings of the motor vehicle. The interpretation of such information about the surroundings as an announcement signal is especially appropriate, because it is thereby possible to anticipate that, with knowledge of this cancellation or increase of the allowed maximum speed, the driver wants to accelerate the vehicle at once.

Alternatively or additionally, however, it is also possible to use information about the surroundings that describes a passing of the crest of a curve driven by the motor vehicle. Such information about the surroundings can be acquired through topographical data of the navigation device or through evaluation of the yaw rate or of the steering lock angle of the motor vehicle, for which purpose sensor data of the driving dynamics regulation device, in particular, are evaluated. If the driver has terminated the actuation of the driving actuation device when entering the curve, for example, in order to travel through the curve at an appropriate speed, then it can be expected that, when the crest of the curve is passed, the driver wants to accelerate the motor vehicle once again, so that an announcement signal chosen in this way makes possible an anticipation of the acceleration command that is especially close to reality.

Finally, it is especially preferred when the information about the surroundings describes a light signal of a set of traffic lights that gives permission to drive or provides notice of the giving or termination of permission to drive. In practice, a driver will typically accelerate the motor vehicle when a set of traffic lights provides notice of or gives permission to drive, in particular through a deactivation of red light, by way of a transition from red to yellow, from red to red and yellow, or from yellow and/or red to green. However, it is just as conceivable that a driver who approaches a set of traffic lights, which, for example, through yellow light, provides notice of an imminent termination of permission to drive, wants to accelerate the vehicle once again in order to still rapidly pass the set of traffic lights. Through evaluation of image data of the camera of the motor vehicle, it is possible to generate such information about the surroundings, which is likewise evaluated in anticipation of an upcoming acceleration. However, it is also conceivable that such information about the surroundings is provided by way of a motor vehicle-to-infrastructure communication.

In the method according to the invention, it can also appropriately be provided that, after the announcement signal is present, the flux density is reduced following the elapse of a predetermined time span and the absence of a confirmation signal. If, after an increase in the flux density of the at least one magnetic field, it should turn out that the driver has not input any acceleration command, the preparatory increase in flux density is retracted after the elapse of a span of time of 1 to 10 seconds, for example, in order to limit the electric energy demand.

In addition, the invention relates to a motor vehicle comprising an electric machine for driving the motor vehicle and a control device, wherein the electric machine can be controlled by the control device in accordance with the method according to the invention. All statements regarding the method according to the invention can be extended analogously to the motor vehicle according to the invention, so that the aforementioned advantages can be achieved with said motor vehicle.

BRIEF DESCRIPTION OF THE DRAWINGS

Further details and advantages of the invention ensue from the exemplary embodiments described below as well as on the basis of the drawings. Shown herein are.

DETAILED DESCRIPTION

Figure 1:
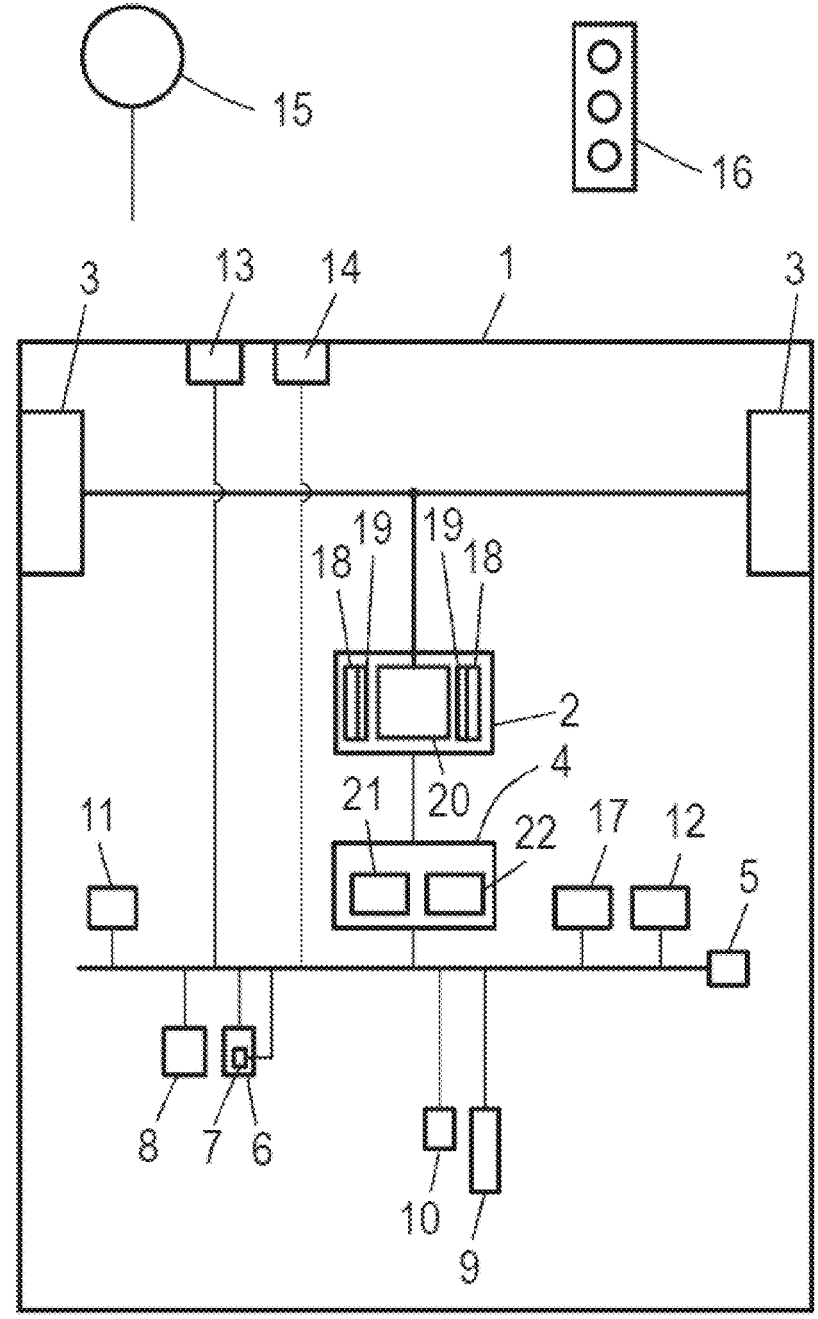
FIG. 1 a schematic sketch of a motor vehicle according to the invention.

FIG. 1 shows a schematic sketch of a motor vehicle 1, comprising an electric machine 2 for driving the motor vehicle 1, a plurality of wheels 3, to which the torque of the electric machine 2 is transmitted, a control device 4 that controls the electric machine 2, and a databus 5, to which the control device 4 has access.

The motor vehicle 1 has, in addition, a driving actuation device 6 in the form of an accelerator pedal with a proximity sensor 7, which measures an approach of a foot of a driver to the driving actuation device 6 and generates sensor data that describe said approach. Additionally provided is a first braking actuation device 8 in the form of a brake pedal, which acts on an operating brake unit of the motor vehicle 1, as well as a second braking actuation device 9 in the form of a hand lever, which acts on a parking brake of the motor vehicle 1. Via the operating element 10, which is designed as a touch-controlled element or as a possible input at a human-machine interface, the driver can activate a sport mode of the motor vehicle 1, in which, among other things, also a harder or harsher chassis adjustment is specified. Furthermore, the motor vehicle 1 has a driving dynamics regulation device 11, which implements the function of an electronic stability program (ESP) and comprises a large number of sensors for the determination of driving parameters, such as the yaw rate or a steering lock angle. Moreover, a navigation device 12 is provided, which provides topographical data on the surroundings of the motor vehicle 1. Arranged at the front end of the motor vehicle are, furthermore, a camera 13 and another environmental sensor 14 in the form of, for example, a radar sensor, an ultrasound sensor, or a laser sensor, which detects the surroundings of the motor vehicle in the direction of travel. By way of example, a traffic signal 15 as well as a set of traffic lights 16 are shown, which can be situated in the surroundings of the motor vehicle 1. Via a communication device 17 of the motor vehicle, the motor vehicle 1 receives, in addition, information about the operating state of the set of traffic lights 16 via motor vehicle-to-infrastructure communication. The aforementioned components each have a communication link to the bus system 5 and supply to it data signals for the control device 4.

The electric machine 2 is designed as an asynchronous machine and comprises a stator 18 with a plurality of stator windings 19 as well as rotor 20 in the form of a squirrel cage rotor. The stator windings 20 generate a magnetic field in the form of a stator field, the flux density of which can be varied depending on a control by the control device 4. The control device 4 has, in addition, a memory unit 21 and a timer 22 and controls the electric machine 2 as described below.

Figure 2:
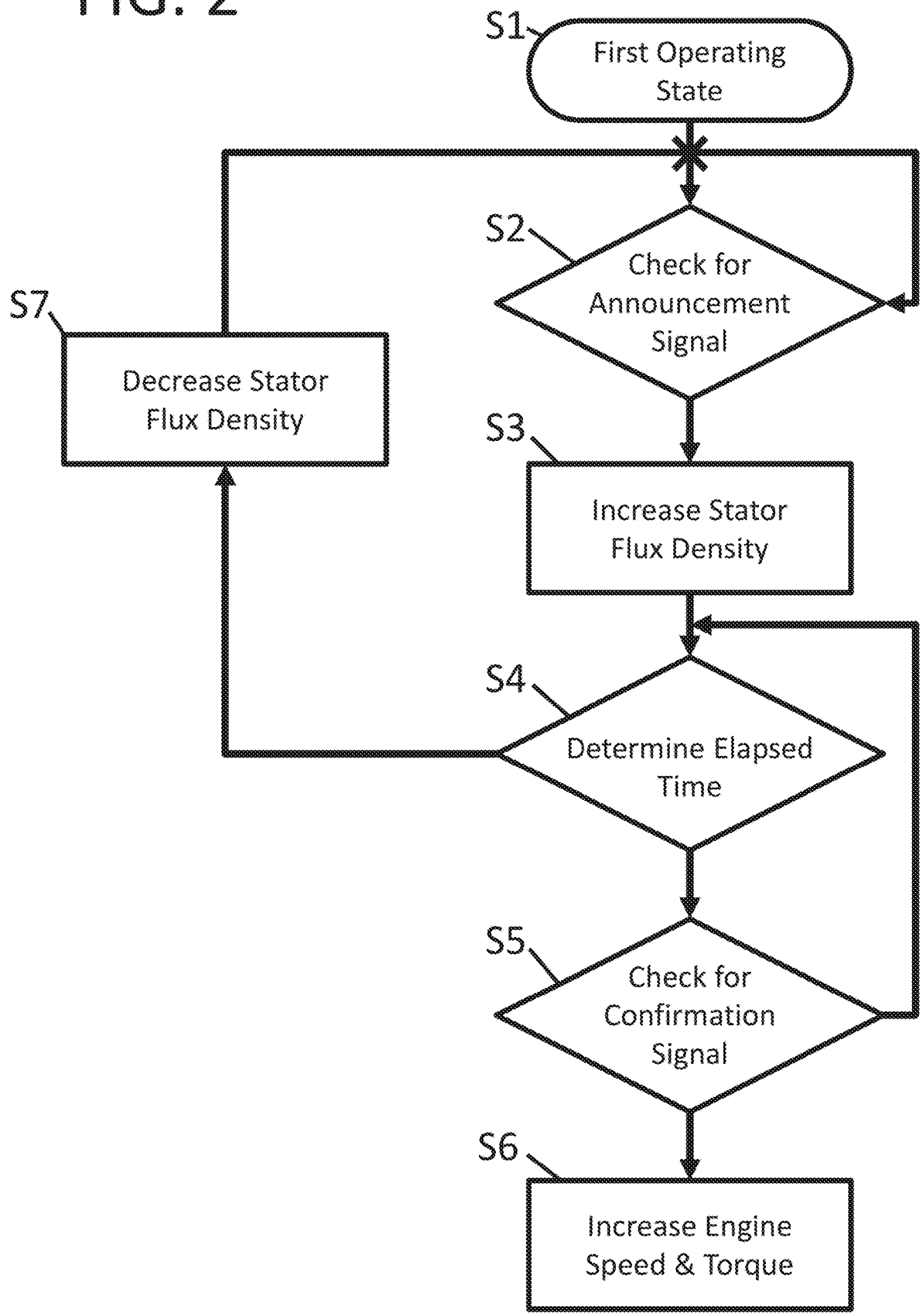
FIG. 2 a flow chart of a method according to the invention for controlling an electric machine for driving the motor vehicle shown in FIG. 1.

FIG. 2 is a flow chart of a method for controlling the electric machine 2 for driving the motor vehicle 1.

In a step S1, the electric machine 2 is found in a first operating state, in which the stator windings 19 are supplied with current at only very low power, because the motor vehicle 1 is at a standstill or is driving in coasting operation. The method is then aimed at initiating the acceleration operation as rapidly as possible when there is an acceleration command of the driver, that is, without or with only very short latency times, which are required for the building up of the stator field generated by the stator windings 19.

For this purpose, in a step S2, it is continuously checked whether an announcement signal announcing an acceleration command of the driver is present. For this purpose, the data signals are recorded and evaluated on the bus system 5, wherein, in the memory unit 21, certain characteristics of the data signals that are to be evaluated as announcement signals are on file. The announcement signals used are defined here in such a way that, when they are present, it can be concluded that an imminent acceleration command of the driver is present.

On the one hand, it can be assumed that the driver wants to accelerate when he releases one of the braking actuation devices 8, 9 and actuates the operating element 8 in order to shift to the sport mode or when the proximity sensor 7 generates sensor data that indicate an approach of the foot of the driver to the driving actuation device 6. Moreover, the control device 4 also evaluates certain information about the surroundings, which is generated by the driving dynamics regulation device 11, the camera 13, the additional environmental sensor 14, or the communication device 17, as control signals.

In this way, the detection of a cancellation or an increase of a speed limit by the traffic light 15 is evaluated as an announcement signal, because, in this case, it can be anticipated that the driver wants to accelerate the motor vehicle 1. In analogy to this, when permission to drive is given or when notice of the giving or termination of permission to drive is provided by a traffic light of the set of traffic lights 16, such an imminent acceleration command is assumed. This situation exists, for example, when the traffic light (depending on the sequence of lights dictated by traffic law regulations) changes from red to green, from red to yellow, from red to red-yellow, from yellow to green, or from red-yellow to green. It is likewise provided that, when a termination of permission to drive is detected, that is, when there is a change from green to yellow or from green to green-yellow, an announcement signal is evaluated, because, in this case, the driver wishes to accelerate in the near term in order to still legally pass the set of traffic lights 16 before permission to drive is cancelled. When the set of traffic lights 16 is appropriately equipped, the respective signal state can also be transmitted and correspondingly evaluated via the communication device 17 by way of motor vehicle-to infrastructure-communication.

It is further provided that, in the case of information about the surroundings that describes passing the crest of a curve traveled by the motor vehicle 1, an announcement signal is generated. For this purpose, the steering angle and the yaw rate of the motor vehicle 1, which are recorded by the driving dynamics device 11, and topographical data on the curve course of the navigation device 17 are evaluated.

Another announcement signal is generated, in addition, when the motor vehicle is at a standstill and, at the same time, the driving actuation device 7 and the first braking actuation device 8 are actuated. Such an actuation of the accelerator pedal and the brake pedal corresponds to a launch control function of classical motor vehicles with an internal combustion engine, for which the internal combustion engine is brought to a high speed when the starting clutch is disengaged in order to generate a starting acceleration that is as high as possible.

If none of the aforementioned announcement signals are present, then step S2 is repeated cyclically. In contrast, once an announcement signal is present, the method is continued in a step S3 and the electric machine 2 is switched to a second operating state. In this case, the electric machine 2 is controlled to increase the flux density of the stator field of the stator 18, wherein the stator windings 19 are supplied with current at a high power. Therefore, through pre-magnetization, a strong rotating field is built up within the stator 18 in order to make possible a rapid acceleration of the motor vehicle 1 when there is an upcoming acceleration command of the driver. This can also be regarded as a feed-forward control of the electric machine 2. The frequency of the rotating field is chosen here in such a way that it is synchronous with the rotational speed of the rotor 20 and thus no torque is generated by the electric machine 2. Moreover, in the step S3, the timer 22 is started.

In a step S4, said timer checks whether a predetermined time span on file in the memory unit 21 has elapsed. If this is not the case, the method is continued with a subsequent step S5 by checking for the presence of a confirmation signal confirming the announced acceleration command. An actuation of the driving actuation device 7 is on file in the memory unit 21 as a confirmation signal. However, an exception applies for the case when the announcement signal was the simultaneous actuation of the driving actuation device 6 and the first braking actuation device 8. In the latter case, the release of the first braking actuation device 8 is detected as a confirmation signal, since this corresponds to the accelerated startup during launch control with a classical internal combustion engine. If no confirmation signal is present, then there is a jump back to S4 for further carrying out the method.

Otherwise, when there is a confirmation command, a step S6 is carried out by controlling the electric machine 2 so as to increase its rotational speed and its torque. This means that the stator windings 19 are supplied with current only in such a way that a slippage is given in regard to the rotational frequency of the rotor 20 and thus the torque with the increased rotational speed is conveyed to the wheels 3. Consequently, the acceleration occurs directly when the acceleration command of the driver is detected, either through the actuation of the driving actuation device 6 or through the release of the first braking actuation device 8. For the control of a conventional electric machine that uses only the actuation of an accelerator pedal for control, it would be necessary at this point in time first to build up a magnetic field in order to then be able to accomplish an increase in the rotational speed or in the torque and consequently an acceleration. By way of the method, the required latency time for this purpose is avoided and a faster commencement of the acceleration is made possible.

If the timer reaches the predetermined time span in step S4 and a confirmation signal has not ensued within said time, the method is continued in a step S7. In said step, the flux density of the stator field is decreased by controlling the electric machine 2 to reduce the supply of current to the stator windings 19. In anticipation of the acceleration command, there thus does not follow any actual corresponding action of the driver, so that, in order to avoiding any further energy expenditure for the preparatory maintenance of the stator field, a switch is made back to the first operating state. The method is then continued in step S2 with the checking for the presence of a new announcement signal.

However, the method described above is not limited to asynchronous machines, so that basically any type of machine can be used. The increase or the building up of the magnetic field can occur, for example, directly in the rotor 20 and also, through induction effects, in the stator 18. In another exemplary embodiment of a motor vehicle 1, the electric machine 2 is a permanently excited synchronous machine, wherein, here, too, in the step S3, the flux density of the stator field is increased in order to achieve a certain reduction in the latency times for such electric machines 2.

In another exemplary embodiment of a motor vehicle 1, the electric machine 2 is designed as a separately excited synchronous machine, wherein the rotor 20 has an exciter winding for generation of an exciter field. In the step S3, when said electric machine 2 is controlled, additionally a flux density of the exciter field is also increased by supplying current to exciter windings of the rotor 20. This also makes possible a significant reduction in latency times when the motor vehicle 1 is accelerated.

The invention claimed is:

1. A method for controlling an electric machine for driving a motor vehicle, comprising:
increasing a flux density of at least one magnetic field generated in the electric machine when an announcement signal that announces an upcoming acceleration command by the driver is present, and when a confirmation signal that confirms the announced acceleration command is present, the electric machine is controlled in such a way that the rotational speed and/or the torque thereof increases, wherein an announcement signal is used that is generated when an operating element that does not correspond to a driving actuation device is actuated, and/or wherein an announcement signal is used that is generated by evaluation of information describing the surroundings of the motor vehicle in the direction of travel.

2. The method according to claim 1, wherein the electric machine has a stator with a plurality of stator windings for generating a stator field as a magnetic field, wherein the stator windings are supplied with current to increase the flux density of the stator field.

3. The method according to claim 1, wherein the electric machine has a rotor with at least one exciter winding for the generation of an exciter field as a magnetic field, wherein the at least one exciter winding is supplied with current to increase the flux density of the exciter field.

4. The method according to claim 1, wherein a confirmation signal is used that is generated when a driving actuation device of the motor vehicle is actuated.

5. The method according to claim 1, wherein an additional announcement signal is used that is generated when a braking actuation device is released and/or by evaluation of sensor data of a proximity sensor measuring an approach of the driver to a driving actuation device.

6. The method according to claim 1, wherein, when the motor vehicle is at a standstill, an additional announcement signal is used that is generated when a driving actuation device is actuated together with a braking actuation device, wherein, in the presence of said additional announcement signal, a confirmation signal is used that is generated when the braking actuation device is released.

7. The method according to claim 1, wherein the information about the surroundings describes a cancellation or an increase of a speed limit and/or a passing of a crest of a curve traveled by the motor vehicle and/or a light signal of a set of traffic signals that gives permission to drive or provides notice of the giving or termination of permission to drive.

8. The method according to claim 1, wherein, after the presence of the announcement signal, if a predetermined time span has elapsed and a confirmation signal is absent, the flux density is reduced.

9. A motor vehicle, comprising an electric machine for driving the motor vehicle and a control device, wherein the electric machine can be controlled by the control device in accordance with a method according to claim 1.

* * * * *